J. M. LAYTON & H. G. HAWORTH.
SWEEPING MACHINE.
APPLICATION FILED AUG. 15, 1913.
1,128,883.
Patented Feb. 16, 1915.
4 SHEETS—SHEET 1.
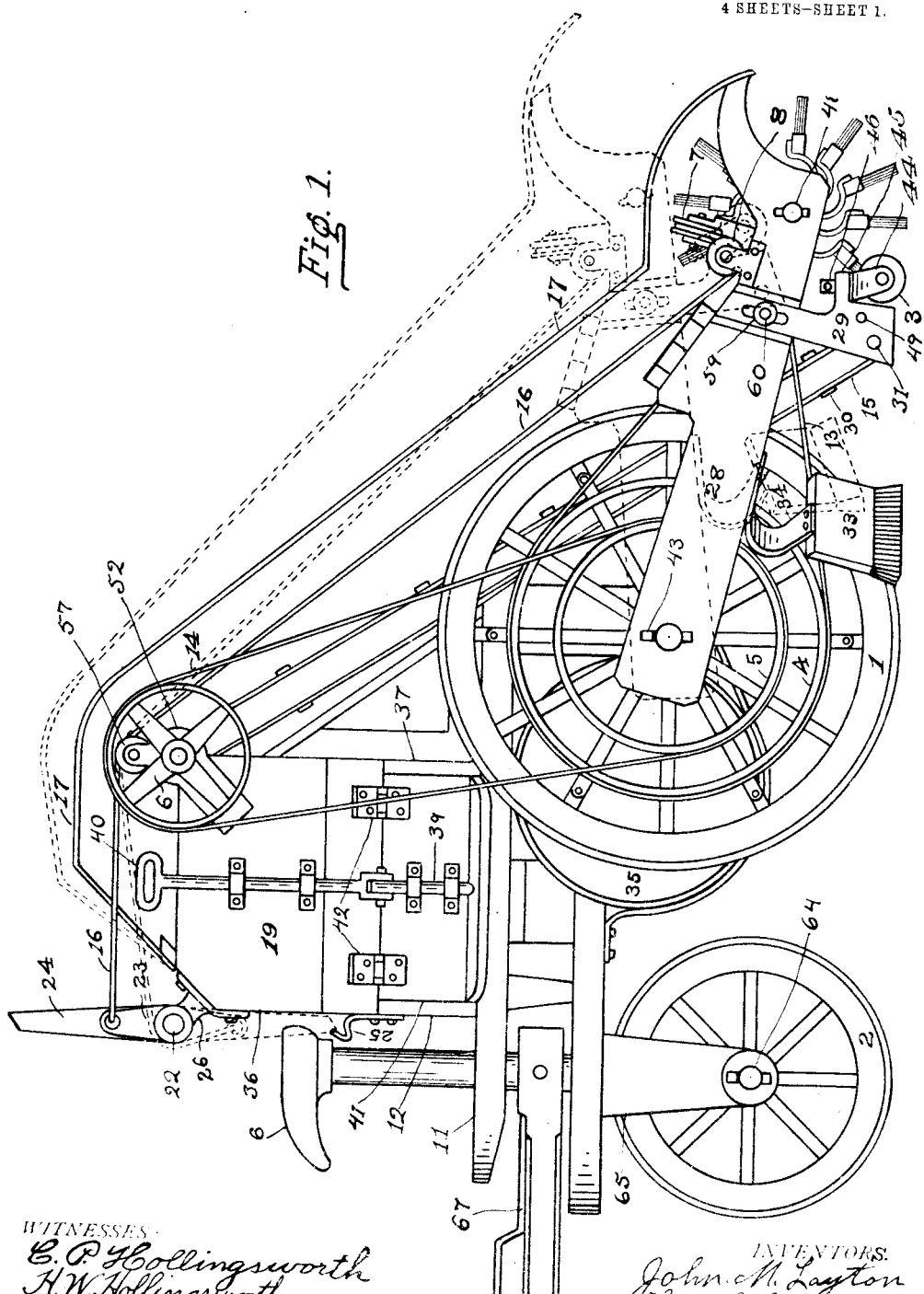

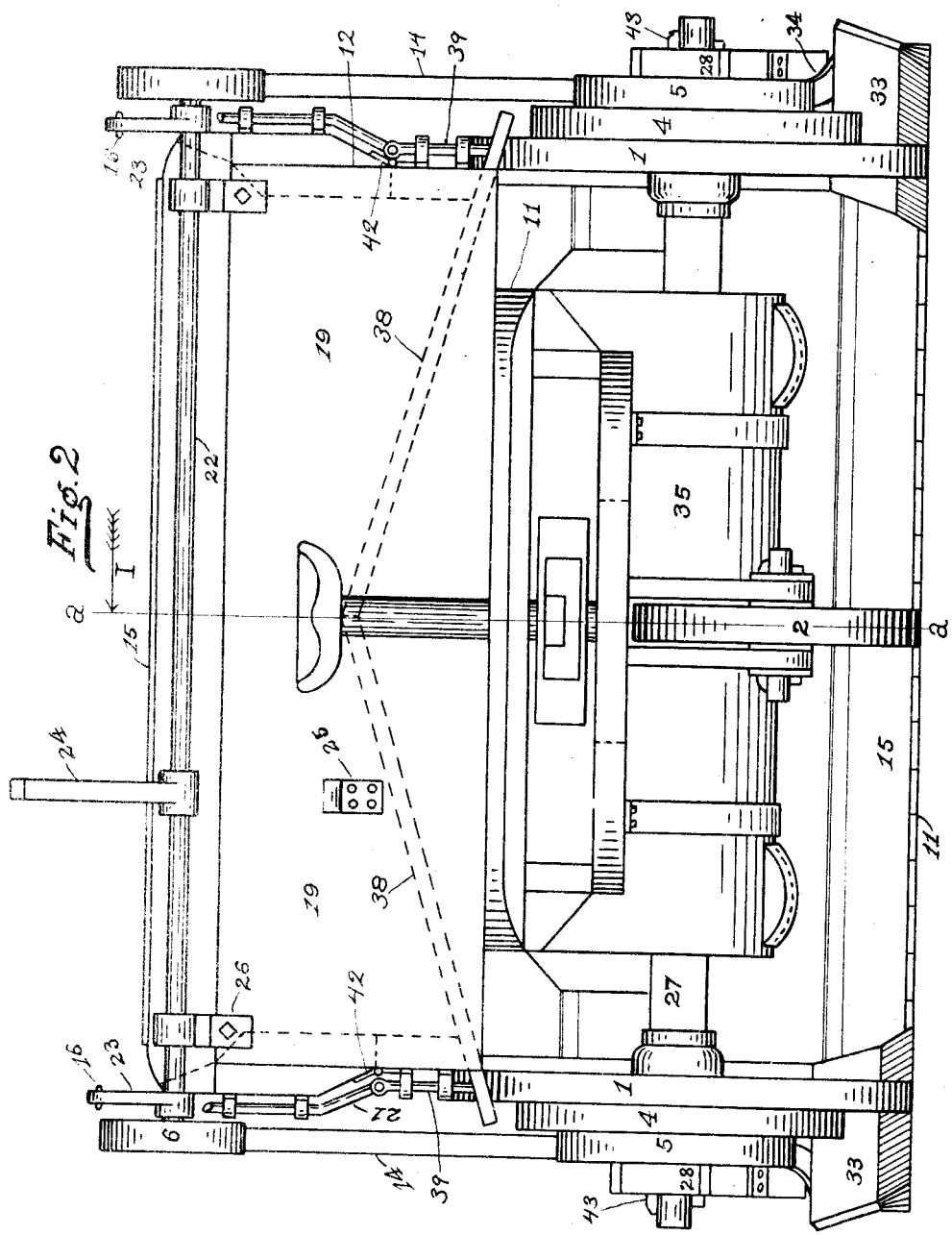

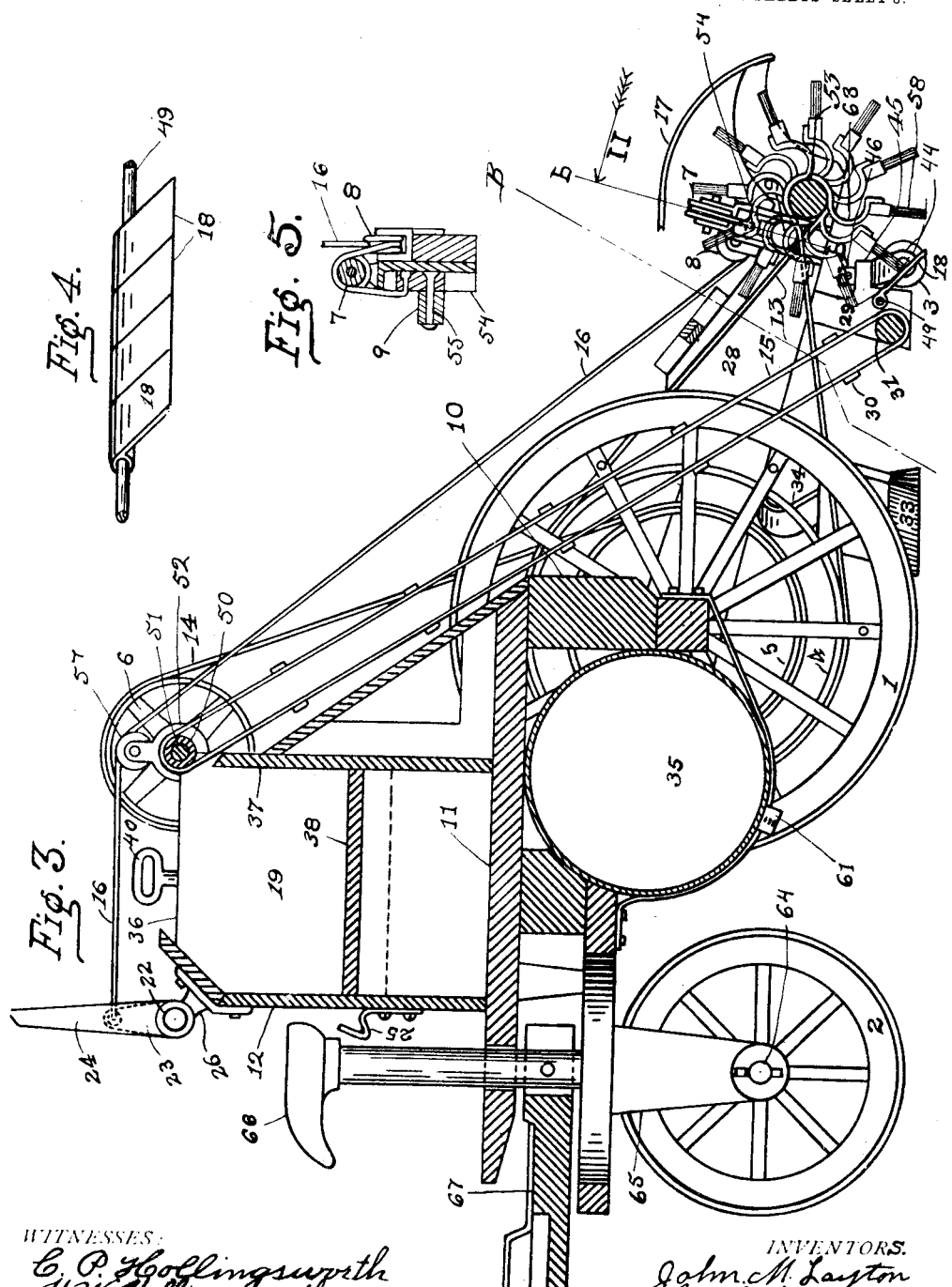

J. M. LAYTON & H. G. HAWORTH.
SWEEPING MACHINE.
APPLICATION FILED AUG. 15, 1913.
1,128,883.
Patented Feb. 16, 1915.
4 SHEETS—SHEET 4.
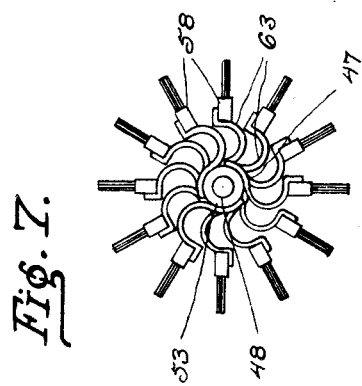
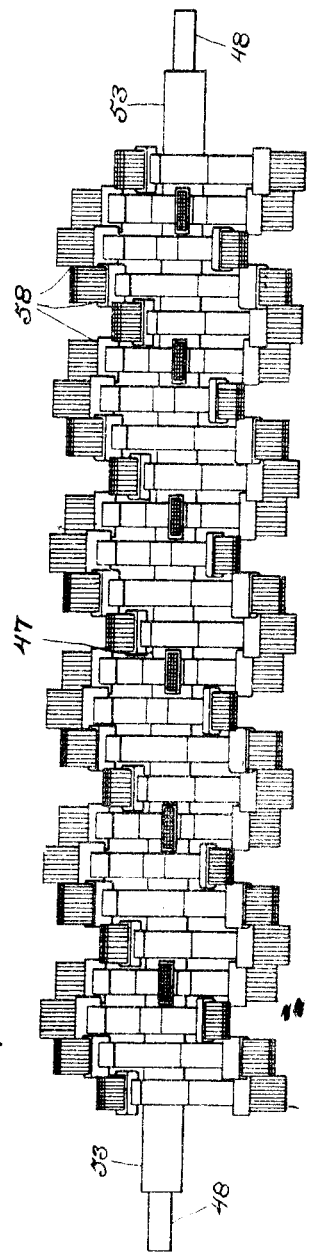
WITNESSES:
INVENTORS.
John M. Layton,
Henry G. Haworth.
BY Wm. F. Davis, ATTORNEY.

UNITED STATES PATENT OFFICE.

JOHN M. LAYTON AND HENRY G. HAWORTH, OF LEAVENWORTH, KANSAS.

SWEEPING-MACHINE.

1,128,883.  Specification of Letters Patent.  Patented Feb. 16, 1915.

Application filed August 15, 1913. Serial No. 784,944.

*To all whom it may concern:*

Be it known that we, JOHN M. LAYTON and HENRY G. HAWORTH, citizens of the United States, residing at Leavenworth, in the county of Leavenworth and State of Kansas, have invented certain new and useful Improvements in Sweeping-Machines, of which the following is a full, clear, and exact description, such as will enable others skilled in the art to which it appertains to make and use the same.

The invention relates to sweeping machines for sweeping streets road-ways and the like and seeks to provide a simple and effective form of sweeping machine that will sweep and thoroughly clean an uneven as well as an even street or road-way and remove the sweepings therefrom.

Sweeping machines are provided with rotary sweepers that sweep the sweepings from the surface of the street to an elevating conveyer by which they are elevated to some form of receptacle and occasionally emptied. It is essential that the rotary sweeper gather all the sweepings from the street which is often very uneven, with numerous holes or depressions, and obstructions that rise above the average surface, and that the sweepings be elevated and deposited in a receptacle from which they may be removed in the shortest space of time. Means for lifting the rotary sweeper above the surface of the street and releasing the driving belts of the sweeper when not in use, and means to adjust the height of the sweeper while in use to give more or less pressure to the brooms on the surface of the street, according to the character of the sweepings, are very desirable.

The present invention seeks to provide an improved sweeping machine with a rotary sweeper for the purpose of sweeping streets and delivering the sweepings into a receptacle from which they may be emptied from time to time.

A further object of the invention is to provide an improved means for raising and lowering the rotary sweeper to diminish or increase the contact thereof respectively with the street.

A still further object of the invention is to provide means for releasing the driving belts of the rotary sweeper so that the latter may be simultaneously lifted from operative position and the rotation thereof suspended, to avoid turning the sweeper at all times when not in use.

The subject matter of the present application is substantially that of applicants' abandoned application Serial No. 637,240.

With these and other objects in view the invention consists in the features of construction, combinations and arrangements of parts hereinafter set forth illustrated in the drawings and more fully pointed out in the claims appended.

In the drawings: Figure 1 is a view in side elevation of a sweeping machine embodying the invention. Fig. 2 is a view in front elevation but with certain parts removed. Fig. 3 is a view in vertical longitudinal section with certain parts removed, taken on line $a$—$a$ of Fig. 2 looking in the direction of arrow I. Fig. 4 is a fragmentary view of the sectional plate incline across which the sweepings are swept to the elevating apron. Fig. 5 is a fragmentary view in vertical cross section on line $b$—$b$ of Fig. 3 looking in the direction of arrow II. Fig. 6 is a view in longitudinal elevation of the rotary sweeper. Fig. 7 is a view in end elevation of the rotary sweeper.

Wheels 1 are journaled on and support the axle 27, the block 10 resting thereon and in turn supporting the rear end of platform 11, which serves to support the sweepings collecting chamber 19. Chamber 19 is inclosed by front wall 12, end walls 36, rear wall 37, and has a bottom 38 inclining outward and downward to either side of the machine so the sweepings may be easily removed from the chamber by raising latches 39 with handle 40, allowing doors 41 to swing outward and upward on the hinges 42, the top of the chamber being open except the loosely fitting shield 17. The front of platform 11 is supported by wheel 2, front axle 64, and yoke 65 to the upper end of which is secured the seat 66, and to the intermediate portion of which is secured a tongue connection 67 to which connections may be made to draw the machine.

Pivoted to the axle 27 near either end are the swinging frames 28, held in place by keys 43 and supported at the rear end when the rotary sweeper is lowered to working position, by caster rollers 3 which are contained in containing jaws 44, the latter being pivoted to lugs 45 of the adjustable sections 29 of frames 28 by pin projections 46.

It will be understood from the foregoing that rollers 3 roll on the surface of the street and support the rear or outward ends of frames 28.

The rotary sweeper is provided with journals 48 journaled in the swinging frame 28 rearwardly of the adjustable sections 29 and the sections 29 are made adjustable in the frame 28 in order to raise and lower the rotary sweeper 47, the adjustment being effected by loosening nuts 59 on the bolts 60 and sliding the sections 29 upward or downward until the rotary sweeper has the desired pressure on the street when in working position.

Immediately in front of the rotary sweeper 47 are inclined plates 18 made in short sections and pivoted on the shaft 49 which is secured at the ends in adjustable sections 29 of the frame 28, the object being for the plates to lie close in front of and underneath the front side of the rotary sweeper 47, each short section making contact with the street surface by reason of the weight and independent movement of the section, even though the surface of the street is uneven or irregular. The plates 18 form an elevating incline over which the rotary sweeper 47 sweeps and brushes the sweepings from the street and on to the apron 15, the latter rolling on roller 31 at the lower and roller 50 at the upper end.

Apron 15 is provided with slats 30 which catch the sweepings and carry them to the chamber 19, and when a sufficient collection is gathered in the chamber, the doors 41 may be opened and the chamber emptied.

Roller 31 is journaled in the adjustable sections 29 of the frame 28, so that the rotary sweeper may be lowered and raised without changing the distance between rollers 31 and 50. It will be understood that rollers 3 remain on the street surface when the rotary sweeper is in working position and the height of the sweeper is adjusted without interfering with the location of rollers 3, sectional plates 18, or roller 31.

Roller 50 is mounted on shaft 51, journaled in boxes 52, and driven by pulleys 6 by belts 14 from pulleys 5 secured to the wheels 1, the apron 15 being driven by roller 50.

Rotary sweeper 47 is driven from pulleys 4 secured to wheels 1, with belts 13 which run directly on the shaft 53 of the sweeper, the belts being crossed to reverse the motion and held in tension on the pulleys and shaft by tightener pulleys 9 which act through their own weight and that of yokes 54, to which they are revolubly connected by pins 55.

To the frames 28 between the axle 27 and rollers 3 are connected semicircular springs 34, the lower ends of which are secured to and support the brushes 33. Brushes 33 are connected with the front end thereof outward and forward at an acute angle to the line of travel of the machine, and are intended to gather the sweepings from a certain width which the two brushes span and throw the sweepings inward and in the path of the rotary sweeper 47. A more important object of the brushes 33 is to sweep the sweepings away from a curb or the like, sweeping them toward the center line of the travel of the machine, so that they may be gathered by the rotary sweeper 47.

Ropes 16 are secured to arms 23 and pass horizontally rearwardly therefrom and over the pulleys 57, then inclining downwardly and rearwardly to and under pulleys 8, then up and over pulleys 7, and finally down to and connecting with yokes 54. Arms 23 are secured to shaft 22, which is journaled in bracket boxes 26 and provided with lever 24 secured thereto. Lever 24 is shown standing upright in Figs. 1—2 and 3 full lines, in which position the ropes 16 are slack and the frames 28 are carried by rollers 3 rolling on the surface of the street, while in Fig. 1 dotted lines the lever is thrown forward and downward to an inverted position and the end latched in latch 25, and in this position frames 28 are raised by ropes 16 as shown in dotted lines of Fig. 1, the tightener pulleys 9 being lifted clear of belts 13, the rotary sweeper is some distance above the surface of the street, and the belts 13 will not drive the rotary sweeper 47. The object of raising the rotary sweeper to the position dotted lines of Fig. 1 is to avoid contact with the surface of the street or road when the machine is being moved from place to place while not in use, the pulleys 9 being lifted to avoid unnecessary turning of the sweeper.

Cover 17 is secured at the upper end thereof to front wall 12 of chamber 19 and fits loosely over and at some distance above the walls of the chamber, slants backward and downward over the apron 15 resting on the rear ends of frames 28, so it may spring as shown in dotted lines of Fig. 1 and not interfere with lifting the frames 28 and the rotary sweeper 47. The object of the cover 17 is to protect the rotary sweeper, the elevating apron 15, and the chamber 19 from wind and air currents, and to prevent dust from rising from the parts enumerated.

The tank 35 is provided to sprinkle the street or road and prevent the machine from raising or agitating dust and the like, the water being sprayed from nozzles 61 further details of which are not illustrated for the reason that no claim is made on the sprinkling mechanism in the present application.

Rotary sweeper 47 is preferably constructed as shown in Figs. 6 and 7, the shaft 53 serving as pulleys at the positions to which the numerals 53 are applied, and arranged to accommodate the belts 13. To the shaft 53 are secured spiral rows of semicircular springs 63, to the outer end of which are secured brooms 58, the object being to provide considerable movement to the brooms under tension in a direction toward and away from the shaft 53 so that the brooms will dip into any hole or depression and spring over any obstruction, and clean a road or street having an uneven surface.

It will be understood from the foregoing that by engaging lever 24 in latch 25, the rotary sweeper 47 will be carried some distance above the surface upon which the wheels 1 and rollers 3 roll, and that the belt 13 will not drive the rotary sweeper, also by unlatching the lever and raising to the position illustrated in full lines of Figs. 1—2 and 3, the frames will be lowered until rollers 3 rest on the surface traversed by wheels 1, and in this position the rotary sweeper may be raised or lowered by raising or lowering the frames 28 on the sections 29, as the ropes 16 are sufficiently slack to allow rollers 3 to rest on the surface traversed at all times. The brooms 33 will sweep the sweepings away from the curb and toward the center of the travel of the machine sufficiently to allow the rotary sweeper 47 to reach and gather all between the distance spanned by the brooms, and the brooms also project to either side beyond all other parts of the machine, so that the street may be swept clean to the width spanned by the brushes 33 or up to and along side of a curb or the like.

It is obvious that by reason of the belt 13 being crossed, if the machine be pulled in such direction that the rotary sweeper will follow the wheels 1, the rotary sweeper will sweep the sweepings across the sectional plates 18 and onto the apron 15 which will elevate the sweepings to the chamber 19, from where they may be easily removed by raising latch bolts 39 by handles 40 and allowing doors 41 to swing open.

Numerous changes may be made in the details as set forth without departure from the essentials of the invention.

Having described our invention, what we claim as new and desire to secure by Letters Patent, is:—

1. In a sweeping machine the combination of ground engaging wheels, a sweepings collecting receptacle carried by said wheels, an axle connecting two of said wheels, a frame including a pair of swinging frame members pivoted to said axle outside of said wheels and projecting approximately horizontally rearwardly therefrom, sections forming part of said frame and crossing said members and adjustably connected thereto and projecting approximately vertically downward therefrom, rollers contained in jaws provided with pins projecting upward and swiveled in lugs projecting from said adjustable sections, said rollers carrying said adjustable sections and the rear ends of said frame members and arranged to roll on the surface traversed by said wheels, a rotary sweeper journaled in said frame members, a shaft spanning said adjustable sections and secured therein, a series of plates pivoted on said shaft and arranged to contact with the surface traversed by said wheels, an apron roller journaled in said adjustable sections, an apron roller mounted over said receptacle, and a conveying apron arranged to roll on said apron rollers whereby said rotary sweeper may sweep sweepings over said plates and to said conveying apron and said apron may convey said sweepings to said receptacle.

2. In a sweeping machine the combination of ground engaging wheels, an axle connecting two of said wheels, a frame including a pair of swinging frame members pivoted to said axle and projecting approximately horizontally rearwardly therefrom, adjustable sections forming part of said frame and crossing said members and adjustably connected thereto and projecting approximately vertically downward therefrom, rollers contained in jaws provided with pins projecting upward and swiveled in lugs projecting from said adjustable sections, said rollers carrying said adjustable sections and the rear end of said frame members and arranged to roll on the surface traversed by said wheels, and a rotary sweeper journaled in said frame members.

3. In a sweeping machine the combination of ground engaging wheels, an axle connecting two of said wheels, a pair of swinging frame members pivoted to said axle and projecting rearwardly therefrom, a rotary sweeper journaled in said frame members, a semi-circular spring secured to one of said frame members and depending therefrom, a brush attached to the lower end of said spring and held by the force of said spring in contact with the surface traversed by said wheels, said brush leading outward from said frame and arranged to sweep sweepings into the path of said rotary sweeper.

4. In a sweeping machine the combination of ground engaging wheels, an axle connecting two of said wheels, a pair of swinging frame members pivoted to said axle and projecting rearwardly therefrom, a rotary sweeper journaled in said frame members, a semicircular spring secured to each of said frame members and projecting downward therefrom, a brush attached to the lower end of each of said springs and held by said springs in contact with the surface traversed by said wheels, said brushes inclined apart at the front and together at the rear whereby sweepings may be swept from a wider space than that traversed by said rotary sweeper and said sweepings swept into the path of said rotary sweeper.

5. In a sweeping machine the combination of ground engaging wheels, an axle connecting two of said wheels, a pair of swinging frame members pivoted to said axle and projecting rearwardly therefrom, a rotary sweeper journaled in said frame members, rollers supporting said rotary sweeper and the rear ends of said frame members when in working position, pulleys mounted on said wheels, belts circling said pulleys and the shaft of said rotary sweeper, guides mounted on said frame members, vertically sliding yokes in said guides, belt tightener pulleys mounted on pins projecting from said yokes and arranged to hold said belts in tension on said shaft and said pulleys, ropes connected to said sliding yokes and running first over said guide connected pulleys then under said frame connected pulleys and then leading to a lifting shaft, and a lifting shaft carried by said wheels and provided with a lever whereby said shaft may be operated to raise said rotary sweeper above operative position and simultaneously therewith raise said tightener pulleys and release the tension of said belts.

In testimony whereof we affix our signatures in the presence of two witnesses.

JOHN M. LAYTON.
HENRY G. HAWORTH.

Witnesses:
R. A. MELVIN,
E. K. SUYDAM.